United States Patent [19]

Hasegawa

[11] 4,357,635
[45] Nov. 2, 1982

[54] DISC MEMORY APPARATUS

[75] Inventor: Takashi Hasegawa, Tokyo, Japan

[73] Assignee: Ricoh Company, Ltd., Tokyo, Japan

[21] Appl. No.: 130,899

[22] Filed: Mar. 17, 1980

[30] Foreign Application Priority Data

| Mar. 20, 1979 | [JP] | Japan | 54-33504 |
| Mar. 20, 1979 | [JP] | Japan | 54-33505 |
| Mar. 20, 1979 | [JP] | Japan | 54-33506 |
| Mar. 20, 1979 | [JP] | Japan | 54-33507 |

[51] Int. Cl.³ .................................................. G11B 5/09
[52] U.S. Cl. .......................................... 360/51; 360/48
[58] Field of Search ................... 360/73, 48, 51, 68, 360/43

[56] References Cited

U.S. PATENT DOCUMENTS

| 2,901,737 | 8/1959 | Stouall, Jr. ........................... 360/73 |
| 3,653,062 | 3/1972 | Hollstein, Jr. ....................... 360/68 |
| 3,803,632 | 4/1974 | Irwin et al. .......................... 360/73 |

*Primary Examiner*—Vincent P. Canney
*Attorney, Agent, or Firm*—David G. Alexander

[57] ABSTRACT

Data is selectively recorded on a plurality of circumferential, radially spaced on a rotating disc (32). Either the rotational speed of the disc (32) or a frequency of write clock pulses is varied so that the data density is substantially the same on all of the tracks.

22 Claims, 18 Drawing Figures

DISC MEMORY APPARATUS

BACKGROUND OF THE INVENTION

The present invention relates to a floppy or hard disc memory apparatus which serves for mass storage of information or data in a computation, word processing or other system.

Floppy discs are being widely used for mass storage in computation systems since they provide high access speed and high volume, consecutive storage. Typically, the disc is driven at constant speed and data written onto or read from a selected circumferential track in synchronism with constant frequency clock pulses. In a typical system, the disc has 77 tracks, each being capable of storing 26 sectors of data, each sector consisting of 128 bytes of data. Thus, each track stores 3328 bytes of data and the total capacity of the disc is 256,256 bytes.

The data density, or the number of bits per inch in the tracks, is maximized in the innermost track, and typically has a value on the order of 3268 bpi. However, due to the fact that the circumference of the outermost track is larger than that of the innermost track, the data density is only on the order of 1775 bpi in the outermost track. The difference is 1493 bpi, and constitutes wasted storage capacity since 1.84 times more data could be stored in the outermost track if the data density was the same as in the innermost track. The wasted storage capacity is also present in the intermediate tracks in a proportional manner. The outermost track is capable of storing 49, rather than 26, sectors of data at a density approximately equal to that of the innermost track, or 6272 bytes rather than 3268.

SUMMARY OF THE INVENTION

A disc memory apparatus embodying the present invention includes a circular memory disc, drive means for rotating the disc and write means for selectively writing data on first and second circumferential tracks on the disc, the second track being spaced radially inwardly from the first track, and is characterized by comprising control means for controlling the write means to write data on the second track with a data density D2 and to write data on the first track with a data density D1 in accordance with the following relation $D1 > D2(R2/R1)$ where R2 is a radius of the second track and R1 is a radius of the first track.

In accordance with the present invention, data is selectively recorded on a plurality of circumferential, radially spaced tracks on a rotating disc. Either the rotational speed of the disc or a frequency of write clock pulses is varied so that the data density is the same on all of the tracks.

It is an object of the present invention to provide an improved disc memory apparatus which has larger capacity than comparable apparatus of the prior art.

It is another object of the present invention to eliminate wasted storage space in a disc memory apparatus.

It is another object of the present invention to provide a generally improved disc memory apparatus.

Other objects, together with the foregoing, are attained in the embodiments described in the following description and illustrated in the accompanying drawing.

DESCRIPTION OF THE PREFERRED EMBODIMENTS

While the disc memory apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
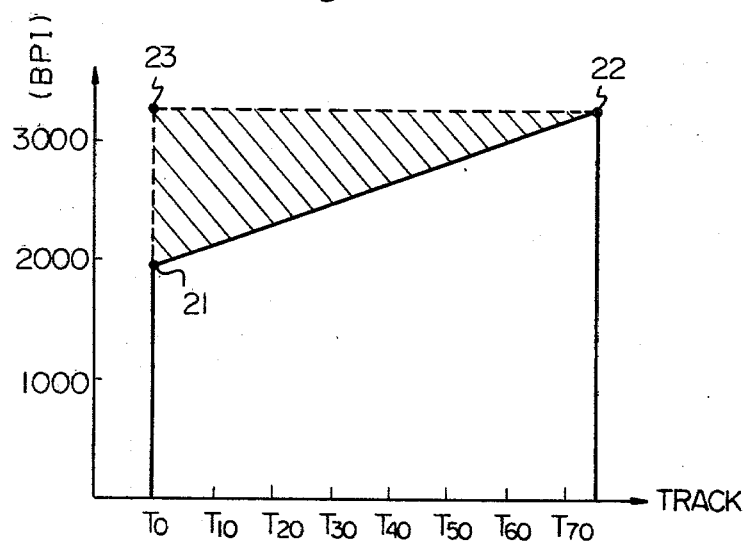
FIGS. 1 and 2 are diagrams illustrating data storage in a disc memory apparatus.
Figure 3:
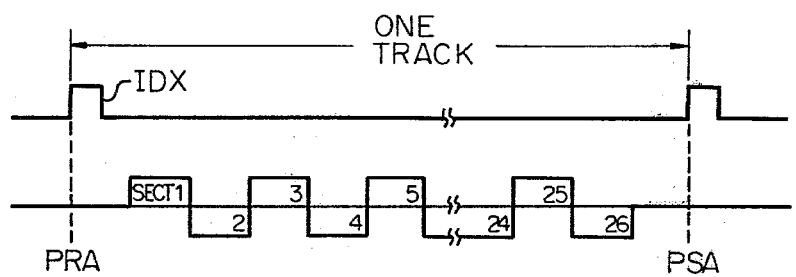
FIG. 3 is a diagram illustrating a data storage format.

Referring now to FIG. 1 of the drawing, it will be assumed that 77 circumferential, radially spaced tracks are provided on a magnetic floppy disc, and that the tracks are designated as T0 to T76 from the outermost track T0 to the innermost track T76. The maximum practical data density is 3268 bits per inch (bpi) and this is the data or recording density in the innermost track T76. In the prior art, the disc is rotated at constant speed and data is recorded or written on a selected track in synchronism with constant frequency clock pulses. Thus, each track, as illustrated in FIG. 3, will consist of a preamble PRA which contains an address or identification area, 26 sectors of actual data, each sector containing 128 bytes of data, and a postamble PSA. The actual data area per track is 3328 bytes and the total data capacity of the disc is 256,256 bytes. In the present arrangement, only the innermost track T76 contains 26 sectors.

As shown in FIG. 1, in the prior art the data density decreases as the track number decreases to a minimum density on the order of 1775 on the track T0 along a line 21-22. Thus, the data density in the track T76 is 1.84 times greater than the density in the track T0. This represents a waste of storage capacity, since the entire disc is capable of storing data at the maximum density of 3268 bpi. The wasted storage capacity is represented in FIG. 1 by a hatched triangle 21-22-23.

Figure 2:
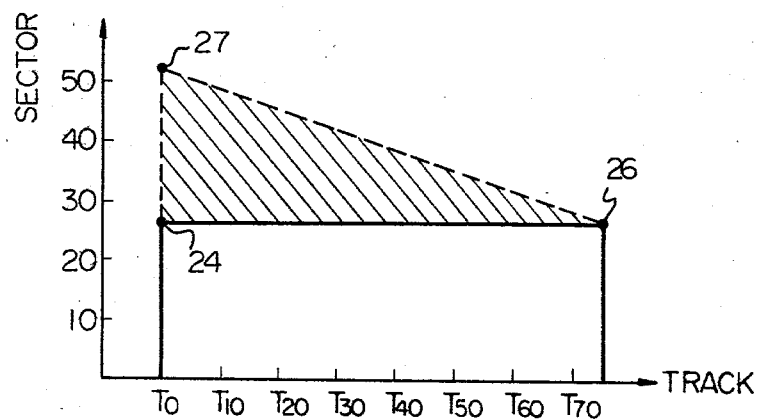

In FIG. 2, the number of sectors per track is constant at 26 as illustrated by a line 24-26. The wasted memory capacity is indicated by a hatched triangle 24-26-27.

In accordance with the present invention, the entire capacity of the disc is utilized by recording data at the maximum density on all tracks as indicated by a line 22-23 in FIG. 1 and a line 26-27 in FIG. 2. This gives an increase in the total capacity of the disc from 256,256 bytes to 362,368 bytes, an increase of 106,112 bytes or 41%. Whereas the track T76 contains 26 sectors as in the prior art, the track T60 has 30 sectors, the track T30 has 40 sectors and the track T0 has 49 sectors. The total number of sectors is 2831, which is 829 sectors greater than the prior art which contains 2002 sectors.

In the prior art, the circumference of each track increases in direct proportion to the radius of the track. Therefore, the data density decreases in direct proportion to the radius of the track. Assuming that the data density for the innermost track T76 is designated as D2, that the radius of the track T76 is R2 and the radius of the track T0 is R1, in the prior art the data density D1 in the track T0 will be $D1 = D2(R2/R1)$. In accordance with the present invention, the data density is increased such that $D1 > D2(R2/R1)$. In the optimal case, $D1 = D2$ and the data density will be constant at the maximum value in the entire disc.

In accordance with the present invention, this goal may be attained in either of two ways. In the first method, the rotational speed of the disc is progressively decreased in a linear manner as the radius of the track on which data is to be written or recorded increases. In the second method, the frequency of write clock pulses is progressively increased in a linear manner as the radius of the track increases. In the first method, $V = K1/R$ where V is the rotational speed of the disc, R is the track radius and K1 is a constant. In the second method, $F = K2R$ where F is the frequency of write clock pulses, R is the track radius and K2 is a constant.

Figure 4:
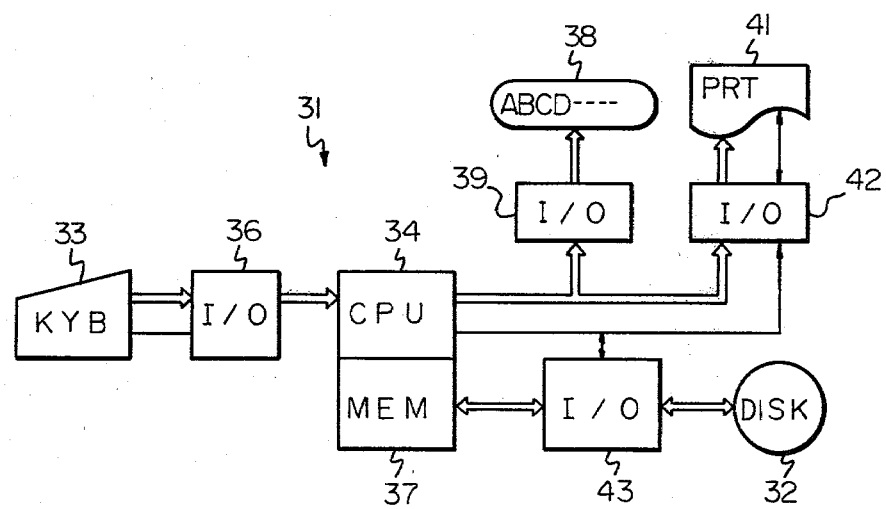
FIG. 4 is a block diagram of a word processor incorporating the present apparatus.

FIG. 4 illustrates a word processor 31 which comprises a floppy disc 32 in accordance with the present invention. Input characters are generated by an operator controlled keyboard 33 in standard ASCII or other format and applied to a central processing unit 34 through an input-output interface 36. A line or page of data to be edited as well as an operating program are stored in a memory 37. The line or page of characters are displayed on a display screen such as a cathode ray tube 38 by means of an input-output interface 39. Data is printed out where required by a printer 41 by means of an input-output interface 42. The operating program as well as bulk data are stored on the floppy disc 32 and recalled by means of an input-output interface 43.

Although the word processor 31 is generally used for composing pages of data in the English language, it is used in various countries such as America, England, France, Germany, Holland, Italy and the like. Although the characters on the keyboard 33, the power supply and other units may be easily modified to meet the standards of the various countries, a major problem exists in that various codes such as a data input code from the keyboard 33, a display code for the unit 38, an output code for the unit 41 and internal processing codes of the CPU 34 differ substantially in the different countries. It is almost impossible for a user to modify the internal hardware of the word processor 31 to accommodate differences in these codes.

It has been generally practiced to provide the operating program in the form of a mask read-only memory (MASK ROM) in the memory unit 37. However, since the MASK ROM is a hardware item, it is extremely difficult for the user to produce a modified system to meet the standards of his particular country.

A practical alternative is to store the operating program on the disc 32 and load it into a random access memory in the unit 37 prior to operation of the word processor 31. This is made possible due to constant advances in the field of MOS RAM technology which result in a price reduction of the memory chips on the order of 50% per year and major increases in the packing density and memory capacity of the chips. Thus, transfer and storage of operating program data in kilogyte blocks from the disc 32 to the memory 37 prior to system operation are quite practical.

Typically, the operating program is stored in the outermost track T0 and sometimes also in the track T1 of the disc 32. It is desirable to provide maximum storage capacity for the track T0 so as to provide increased capacity on the disc 32 for actual data and to store the entire program on and load the program from the single outer track T0. This has generally been impossible in the prior art due to the fact that the outer track T0 has only been able to accommodate 3328 bytes and the operating program exceeds this limit. The present invention overcomes this problem by expanding the storage capacity of the outer track T0 to 6272 bytes which is sufficient to accommodate the entire operating program.

Figure 5:
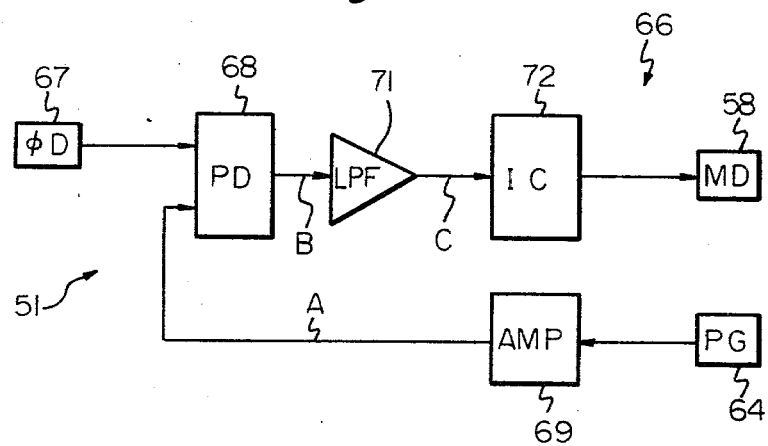
FIG. 5 is a block diagram of a motor control circuit of the present apparatus.
Figure 6:
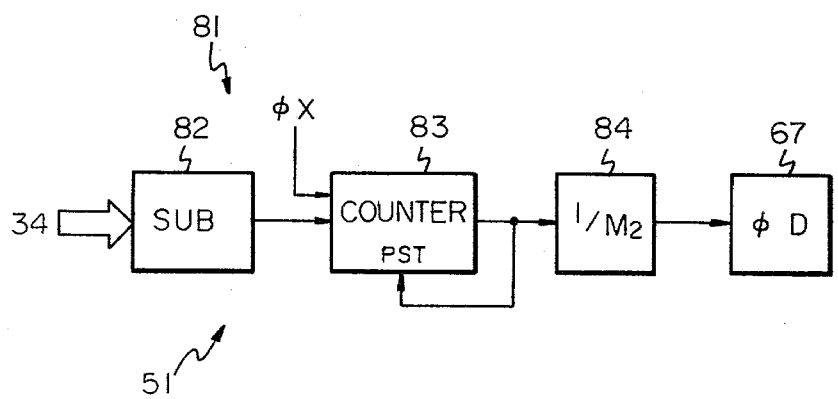
FIG. 6 is a block diagram of a pulse generator for the motor circuit.
Figure 7:
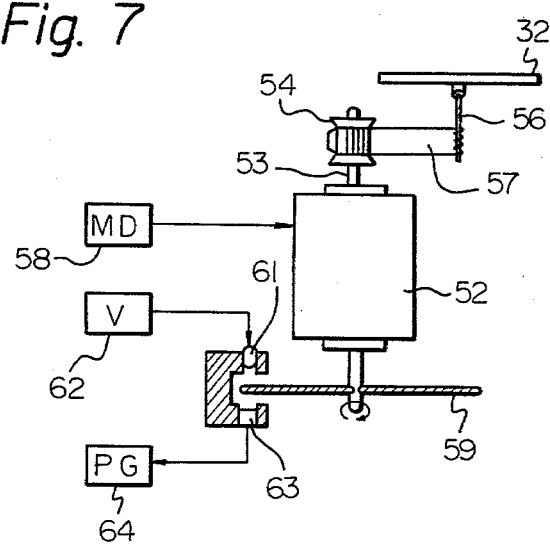
FIG. 7 is a schematic diagram of a timing pulse generator of the apparatus.

A disc memory apparatus embodying the present invention is illustrated in FIGS. 5 to 8 and generally designated as 51. As shown in FIG. 7, the apparatus 51 comprises a drive motor 52 having an output shaft 53. The disc 32 is fixed to a shaft 56 and driven for rotation by the motor 52 through a timing sprocket 54 fixed to the shaft 53 and a timing belt 57 trained around the sprocket 54 and shaft 56. The motor 52 is driven at a rotational speed proportional to current applied thereto from a motor drive unit 58.

A disc 59 is also mounted on the shaft 53 and formed, although not visible in the drawing, with a series of circumferentially spaced slots. A light emitting diode LED 61 is energized by a power source 62 to constantly emit light. Disposed on the opposite side of the disc 59 from the LED 61 is a phototransistor 63. The phototransistor 63 produces a quasisinusoidal output as the phototransistor 63 is alternatingly covered and uncovered by the opaque areas of the disc 59 between the slots. The output of the phototransistor 63 is shaped into a train of clean timing pulses by a pulse generator 64. The frequency of the timing pulses produced by the generator 64 is directly proportional to the rotational speed of the discs 59 and 32.

Referring now to FIG. 5, a servo drive unit for driving the motor at the desired speed is generally designated as 66 and comprises an amplifier 67 which produces motor drive pulses $\Phi D$. The frequency of the drive pulses $\Phi D = PVml$, where P is the number of slots in the disc 59, V is the rotational speed of the disc 32 and ml is the speed ratio between the disc 32 and shaft 53. The frequency of the pulses $\Phi D$ is determined in accordance with the above equation whereas the speed V is selected in accordance with $V = K1/R$.

Figure 8:
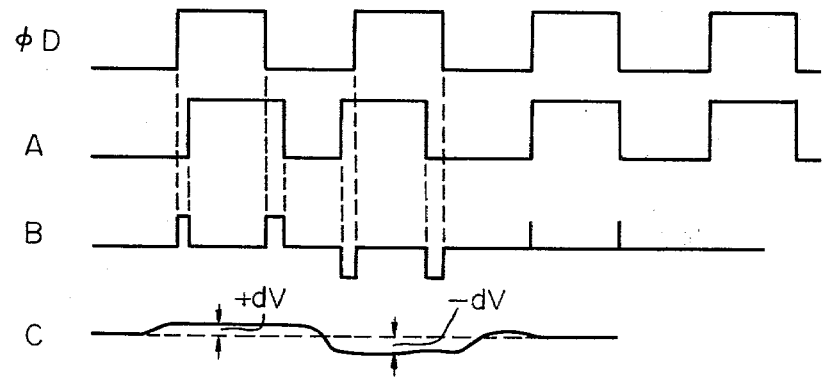
FIG. 8 is a timing diagram illustrating the operation of a phase locked loop control circuit of the apparatus.

The unit 66 comprises a phase locked loop which consists of a phase detector 68 which receives the drive pulses from the amplifier 67 and the timing pulses from the generator 64 via an amplifier 69. The phase detector 68 produces an output corresponding to the difference in phase between the received pulses which is converted to a D.C. voltage by a low pass filter 71. The output of the filter 71 is applied to a constant current source 72 which supplies a constant current to the motor 52 via the motor drive unit 58. The output of the source 72 is automatically adjusted by the unit 68 until the frequencies of the timing pulses and drive pulses are the same, which occurs when the disc 32 is rotating at the desired speed V. FIG. 8 illustrates the operation of the phase locked loop at points A, B and C.

In a practical floppy disc 32, if the distance between adjacent tracks is taken as a unit, the innermost track T76 is spaced 92 units from the center of the disc 32 and the outermost track T0 is spaced by 168 units from the center of the disc 32. Thus, the radius R of a particular track in said units may be determined by subtracting the track number N from 168.

A pulse generator for generating the drive pulses $\Phi D$ is illustrated in FIG. 6 and generally designated as 81. The track number N is applied to a subtractor 82 which subtracts the track number N from 168. The output of the subtractor 82, which is $R = 168 - N$, is applied to parallel preset inputs of a down counter 83. The output of the counter 83 is fed back to a preset command input thereof so that the counter 83 is set to the numerical output of the subtractor 82 upon reaching the count of zero. Fixed clock pulses $\Phi X$ are applied to a clock input of the counter 83 which cause the counter 83 to count down. Thus, the counter 83 functions as a variable frequency divider having a modulo equal to $168 - N$, or the radius R of the track. The output of the counter 83 is applied to a fixed frequency divider 84 having a division ratio of m2. The output of the frequency divider 84 is applied to the amplifier 67 which produces the drive pulses $\Phi D$. In this manner, the pulse generator 81 generates the drive pulses $\Phi D$ at a frequency $\Phi D = \Phi X/[(168-N)(m2)]$.

The drive pulse generator 81 is used as part of a write unit for writing data on the disc 32 and also as part of a read unit for reading the data from the disc 32. In either case, the frequency of the drive pulses $\Phi D$ for the motor 52 and thereby the current output of the source 72 and the rotational speed of the disc 32 are increased as the radius of the track decreases in a linear manner. Thus, the data density is constant at the maximum value in all of the tracks.

The frequency of the drive pulses $\Phi D = PVm1$. It will be recalled that $V = K1/R$. Thus, $\Phi D = (PK1m1/R)$. Where V is expressed in revolutions per minute and V for the innermost track T76 is 360 rpm, $K1 = 33120$ and V for the outermost track T0 is 197 rpm.

Figure 18:
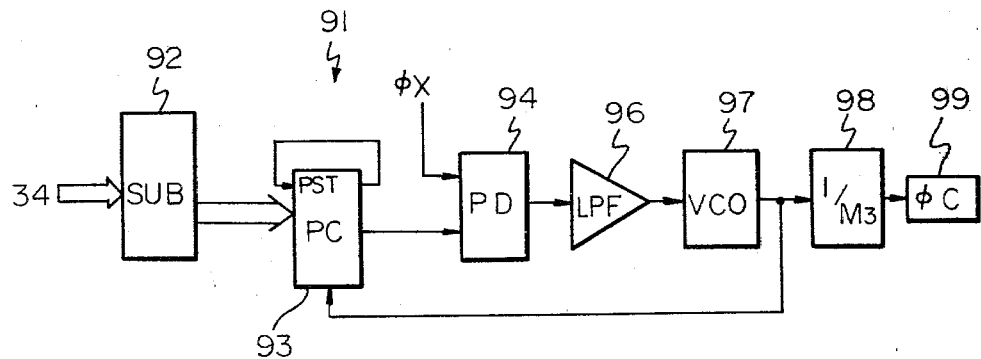
FIG. 18 is a schematic diagram of another embodiment of the present invention.

FIG. 18 illustrates a second embodiment of the present invention in which the disc 32 is rotated at constant speed and the frequency of write clock pulses is increased as the radius of the track on which data is being recorded increases in a linear manner whereas the frequency of the write clock pulses $\Phi D = K2R = F$. In FIG. 18, a write clock pulse generator is generally designated as 91 and comprises a subtractor 92 which is identical to the subtractor 82. The output of the subtractor 92 is applied to parallel preset inputs of a down counter 93 which is identical to the counter 83. The output of the counter 93 is connected to an input of a phase detector 94 of a phase locked loop. The clock pulses $\Phi X$ are applied to another input of the phase detector 94.

The output of the phase detector 94 is connected through a low pass filter 96 to a voltage controlled oscillator 97. The output of the voltage controlled oscillator 97 is connected through a frequency divider 98 having a division ratio of m3 to an amplifier 99. The write clock pulses $\Phi C$ appear at the output of the amplifier 99. The output of the VCO 97 is connected to a clock input of the counter 93.

In operation, the counter 93 is constantly preset to the value $R = 168 - N$ and counts down to zero. Thus, the counter 93 constitutes a frequency divider having a modulo equal to $168 - N$ which is disposed in the feedback loop of the phase locked loop. The clock pulses $\Phi X$ are applied to another input of the phase detector 94. With the phase locked loop in lock, the VCO 97 must produce $168 - N$ pulses for each pulse $\Phi X$. Thus, the pulses $\Phi C$ have a frequency equal to $\Phi X[(168-N)/m3]$, where $R = 168 - N$ and $K2 = \Phi X/m3$. Thus, the frequency of the clock pulses $\Phi C$ is K2R.

In summary, it will be seen that the write pulse generator 91 functions to linearly increase the frequency of the write clock pulses as the radius of the track increases. In this manner, the data density is the same in all of the tracks. It will be understood that the data is written on the disc 32 in synchronism with the write clock pulses $\Phi C$. The frequency divider 98 compensates for variations in the output of the phase locked loop.

In a typical application where $K1 = 43,000$, $\Phi C$ for the innermost track T76 will be 7224 kHz and $\Phi C$ for the outermost track T0 will be 3956 kHz.

Figure 10:
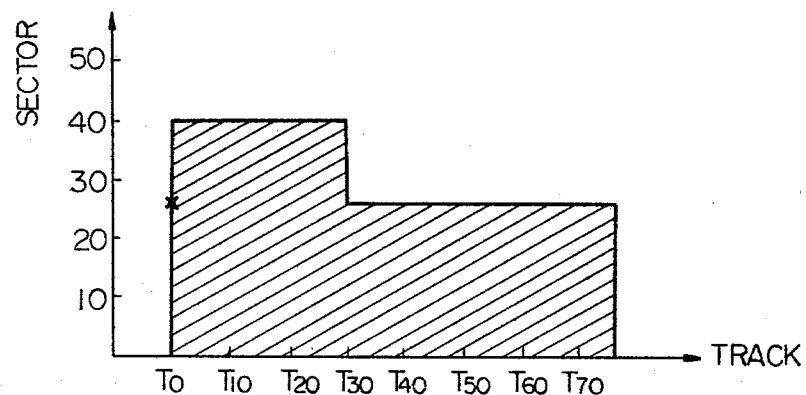
FIGS. 10 and 11 are diagrams illustrating a modified data storage arrangement in accordance with the present invention.
Figure 11:
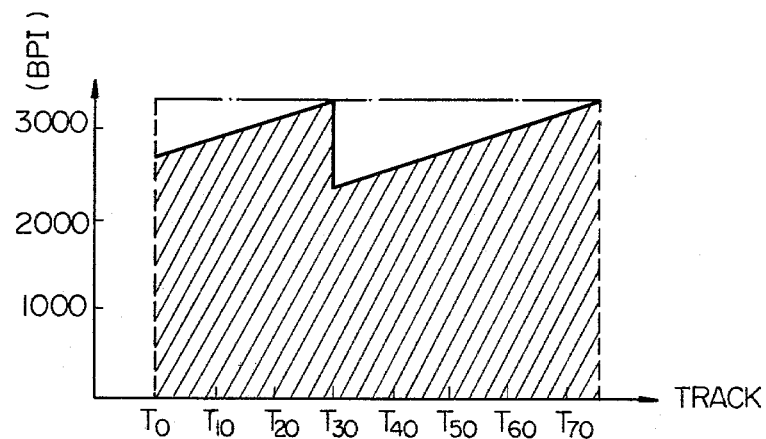

FIGS. 10 and 11 illustrate another embodiment of the present invention which is capable of increasing the data density in the outer tracks with simplified circuitry. In this embodiment, as indicated by hatching, each of the tracks T0 to T30 is recorded with increased density and contains 40 sectors. Each of the inner tracks T31 to T77 is recorded with the standard density and contains 26 sectors. The data density is 3324 bpi in the track T30 and 2731 bpi in the track T0 compared with 2161 bpi and 1775 bpi respectively in the prior art. This is desirable in the word processor 31 since it gives increased capacity in the outermost index or program track T0. It will be understood that any number of tracks may be recorded with increased density such as only the outermost track T0.

Figure 12:
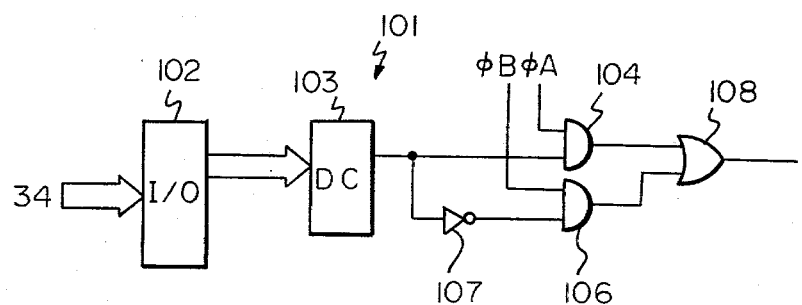
FIG. 12 is a schematic diagram of a selector circuit for practicing the method of FIGS. 10 and 11.

FIG. 12 illustrates a pulse generator 101 for generating pulses $\Phi Z$ which may be used as motor drive pulses or write clock pulses. The track number N is applied through an input-output interface 102 to a decoder 103. The decoder 103 produces a logically high output if the track number is 0 to 30 and a logically low output of the track number is 31 to 76. The output of the decoder 103 is connected directly to an input of an AND gate 104 and through an inverter 107 to an input of an AND gate 106. The outputs of the AND gates 104 and 106 are connected to inputs of an OR gate 108, the output of which produces the pulses $\Phi Z$. Fixed frequency pulses $\Phi A$ and $\Phi B$ are applied to inputs of the AND gates 104 and 106 respectively.

Using the first method of the invention in which the frequency of the motor drive pulses is varied, the frequency of the pulses $\Phi A$ will be 4 mHz whereas the frequency of the pulses $\Phi B$ will be 6 mHz. When the track number is 30 or lower, the AND gate 104 will be enabled to gate the low frequency clock pulses ΦA out as the pulses ΦZ to drive the motor 52 at low speed and vice-versa.

Using the second method of the invention in which the frequency of the write clock pulses is varied, the high frequency pulses (6 mHz) will constitute the pulses ΦA whereas the low frequency pulses (4 mHz) will constitute the pulses ΦB. Thus, when the track number is 30 or below, the high frequency pulses ΦA will be gated out as the pulses ΦZ which in this case are used as write clock pulses, and vice-versa.

The method illustrated in FIGS. 10 to 12 increases the storage capacity of the disc 32 from 256,256 bytes to 311,808 bytes, an increase of 55,552 bytes.

Figure 13:
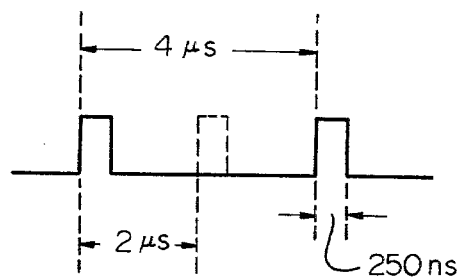
FIG. 13 is a timing diagram illustrating a data storage format.

FIG. 13 illustrates the method of writing data on the disc 32 using FM signals. One bit cell is illustrated as having a duration of 4 μS and comprises a clock pulse having a duration of 250ns and a data pulse or bit which also has a duration of 250ns and is spaced in time from the clock pulse by 2 μS. The clock pulses are illustrated in solid line whereas a data pulse is illustrated in phantom line in FIG. 13. The data bit, when present, indicates logically high data and when not present, indicates logically low data.

Figure 9:
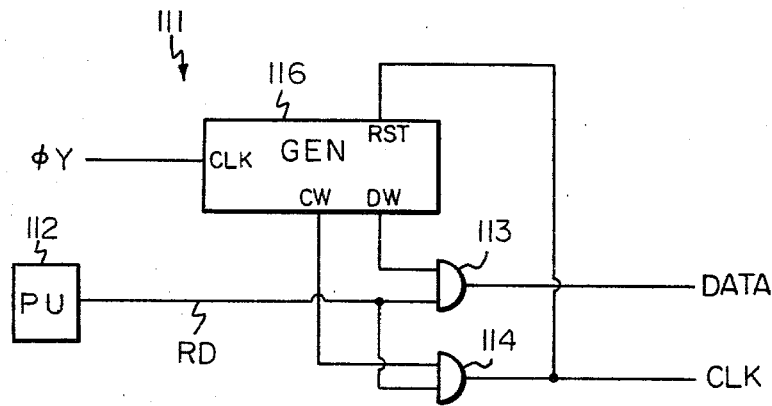
FIG. 9 is a block diagram of a data and clock signal separator of the apparatus.

Since the clock pulses and logically high data pulses have the same format, some means must be provided in the read unit to distinguish them apart. This function is performed by a signal separator unit 111 which is illustrated in FIG. 9.

Figure 14:
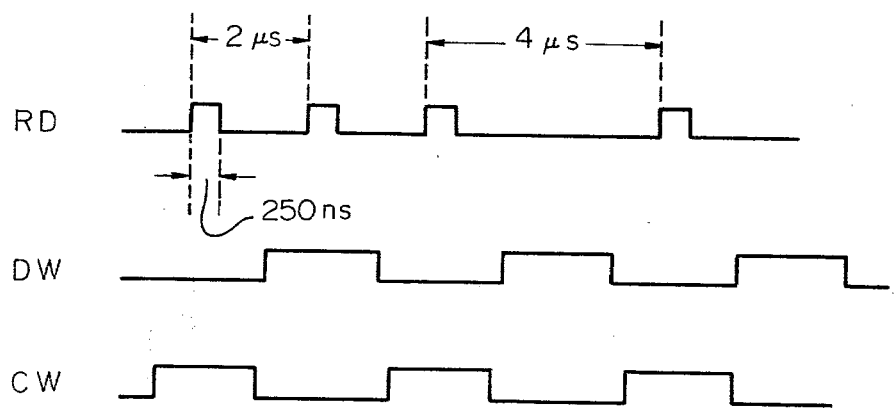
FIG. 14 is a timing diagram illustrating data and clock window signals.

The clock and data signals RD which are picked up from the disc 32 during a reading operation by a pickup unit 112 are applied to inputs of AND gates 113 and 114 which produce at their outputs only the data signals and the clock pulses respectively. A window signal generator 116 feeds data and clock window signals DW and CW respectively to the AND gates 113 and 114 in synchronism with the data and clock pulses. The construction and detailed operation of the generator 116 will be described in detail below. The data and clock window signals are illustrated in FIG. 14 and are generated alternately in synchronism with the data and clock pulses respectively.

Figure 15:
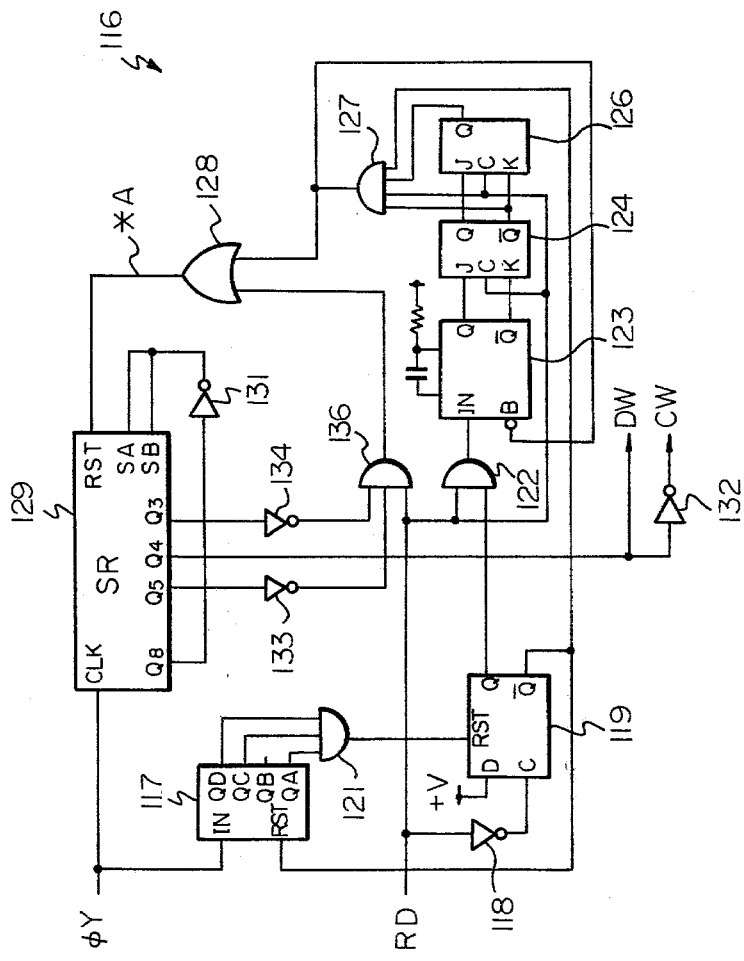
FIG. 15 is a schematic diagram of a data and clock signal separator.

The window signal generator 116 is illustrated in FIG. 15 as comprising a four bit counter 117 which has a clock input connected to receive clock pulses ΦY which have a frequency 16 times higher than the write clock pulses. It will be understood that the write clock pulses are written on the disc 32 between the data pulses and, when read out, constitute read clock pulses.

The data and read clock pulses RD are applied through an inverter 118 to a clock input of a D-type flip-flop 119. The D input of the flip-flop 119 is hard wired to +V. The QA, QC and QD outputs of the counter 117 are connected to inputs of an AND gate 121, the output of which is connected to a reset input of the flip-flop 119.

With the flip-flop 119 reset, the $\overline{Q}$ thereof is high and is applied to a reset input of the counter 117. This unconditionally holds the counter 117 reset to the count of the zero. The trailing edge of a pulse RD, which may be either a clock pulse or a logically high data pulse, sets the flip-flop 119. The $\overline{Q}$ output of the flip-fop 119 goes low, enabling the counter 117 to count the clock pulses ΦY. The AND gate 121 produces a high output which resets the flip-flop 119 when the count in the counter 121 reaches hexadecimal D. Thus, the Q output of the flip-flop 119 is high for a length of time equal to 3 μS after the trailing edge of the pulse RD.

Figure 16:
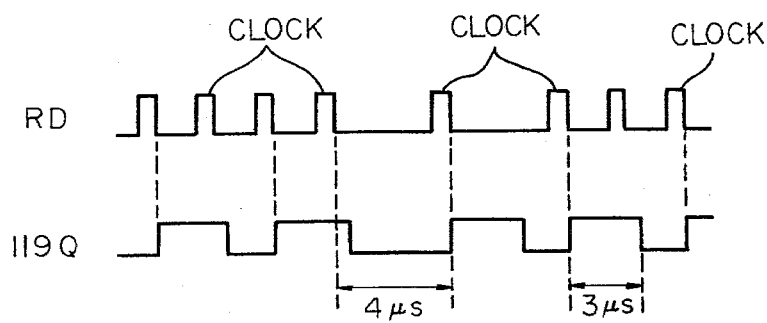
FIG. 16 is a timing diagram illustrating the operation of the signal separator.

As shown in FIG. 16, the identification area in each track comprises at least one logically low data bit surrounded by clock bits. Assuming that the first pulse RD is a logically high data pulse, it will set the flip-flop 119. Since the flip-flop 119 is set, the next clock pulse will have no effect. However, the flip-flop 119 will be reset after 3 μS by the counter 117 and AND gate 121. The flip-flop 119 will continue to be set by the data pulses until a logically low data pulse is received. In this case, the flip-flop 119 will be set by the next clock pulse. Thereafter, due to the provision of the counter 117 and AND gate 121, the flip-flop 119 will continue to be set for 3 μS after the trailing edge of each clock pulse.

The Q output of the flip-flop 119 is connected to an input of an AND gate 122, another input of which is connected to receive the signals RD. The Q output of the flip-flop 119, once being set by the clock pulses, is logically high only during the duration of the data pulses. Thus, only the data pulses are gated through the AND gate 122 to a monostable multivibrator 123.

The multivibrator 123 has a period of 120 μS and is triggered by the leading edge of each logically high data pulse. The output pulse of the multivibrator 123 is connected to a shift register arrangement comprising JK type flip-flops 124 and 126. An AND gate 127 has inputs connected so as to produce a high output when the $\overline{Q}$ output of the flip-flop 124, the Q output of the flip-flop 126, the $\overline{Q}$ output of the flip-flop 119 and the signal RD are all logically high. The components 123, 124 and 126 are designed so that this condition will occur at the leading edge of a clock pulse. At this time, a pulse *A is fed through an OR gate 128 to the reset input of an 8-bit shift register 129.

Figure 17:
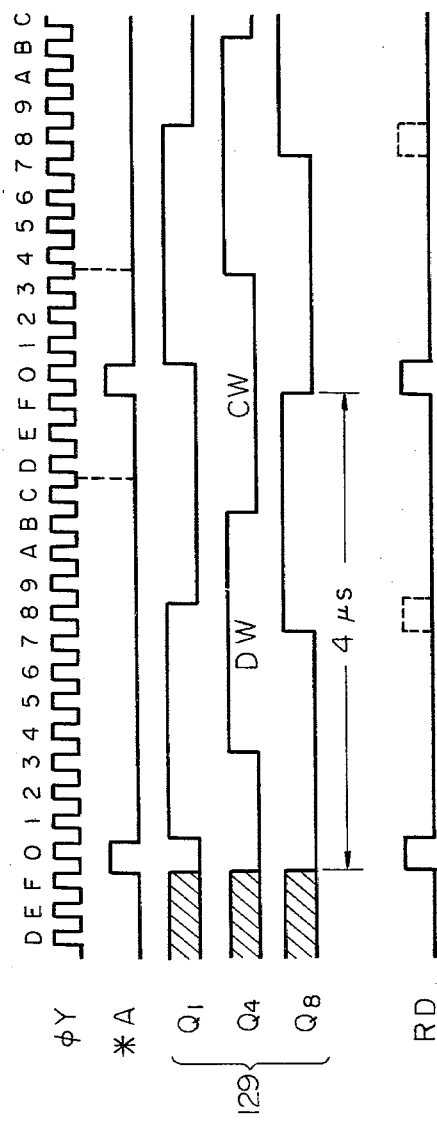
FIG. 17 is another timing diagram illustrating the operation of the signal separator in greater detail.

Referring also to FIG. 17, the clock input of the shift register 129 is connected to receive the clock pulses ΦY as shift pulses. The Q8 output of the shift register 129 is connected through an inverter 131 to both data inputs thereof. With the shift register 129 reset, the output of the inverter 131 is high.

After being reset in synchronism with a clock pulse RD, the shift register 129 shifts in synchronism with the clock pulses ΦY. The output of the inverter 131 stays high for the first 8 clock pulses ΦY so that 8 logically high bits are shifted into the shift register 129. The first logically high bit reaches the Q8 stage of the shift register 129 in response to the 8th clock pulse ΦY so that the output of the inverter 131 goes low. Then 8 logically low bits are shifted into the register 129. The shift register 129 is reset after every 16 clock pulses ΦY by the leading edge of a clock pulse RD.

The Q4 output of the shift register 129 constitutes the data window signal and is inverted by an inverter 132 to constitute the clock window. The signal RD is applied to an input of an AND gate 136, the output of which is connected to an input of the OR gate 128. The Q3 and Q5 outputs of the shift register 129 are connected through inverters 133 and 134 to inputs of the AND gate 136. The AND gate 136 is enabled through the inverters 133 and 134 during a period which overlaps the clock window period by one clock pulse ΦY on each side. As a result, only the clock pulses RD are gated through the gates 136 and 128 to reset the shift register 129. In this manner, the shift register 129 is positively reset to zero by the leading edge of each clock pulse RD. The AND gate 127, flip-flop 119 and associated components are provided to ensure that the shift register 129 is reset by clocks pulse RD rather than logically high data pulses RD and that the data and clock window signals are not inverted. The flip-flop 119 and AND gate 127 circuit also corrects the operation of the unit 116 following erroneous reset of the shift register 129 by noise in the signal RD.

In summary, it will be seen that the present invention overcomes the drawbacks of the prior art and provides a magnetic floppy disc memory apparatus with substantially increased data storage capacity. Various modifications will become possible for those skilled in the art after receiving the teachings of the present disclosure without departing from the scope thereof.

What is claimed is:

1. A disc memory apparatus including a circular memory disc, drive means for rotating the disc and write means for selectively writing data on first and second circumferential tracks on the disc, the second track being spaced radially inwardly from the first track, characterized by comprising:

control means for controlling the write means to write data on the second track with a data density D2 and to write data on the first track with a data density D1 in accordance with the following relation $$D1 > D2(R2/R1)$$

where R2 is a radius of the second track and R1 is a radius of the first track;

the write means being constructed to record data on the first and second tracks in the form of data bits separated by clock bits, the apparatus further comprising read means for selectively reading data from the first and second tracks, the read means including separator means for separating the data bits and the clock bits;

the read means comprising pickup means for picking up the data bits and clock bits from the first and second tracks, the separator means comprising data gate means, clock gate means and window signal generator means for generating clock window signals in synchronism with clock bits picked up by the pickup means and data window signals in synchronism with data bits picked up by the pickup means, the window signal generator means feeding the data window signals to the data gate means which gate the data bits therethrough from the pickup means in response to the data window signals and feeding the clock window signals to the clock gate means which gate the clock bits therethrough from the pickup means in response to the clock window signals.

2. An apparatus as in claim 1, in which the control means is constructed to control the write means in such a manner that D1 is substantially equal to D2.

3. An apparatus as in claim 1, in which the control means is constructed to control the drive means to rotate the disc at a low speed while controlling the write means to write data on the first track and to rotate the disc at a high speed while controlling the drive means to write data on the second track.

4. An apparatus as in claim 3, further comprising read means for selectively reading data from the first and second tracks, the control means controlling the drive means to rotate the disc at the low speed while controlling the read means to read data from the first track and to rotate the disc at the high speed while controlling the read means to read data from the second track.

5. An apparatus as in claim 3, in which the drive means comprises a drive pulse generator for generating drive pulses and a drive unit for rotating the disc at a speed proportional to a frequency of the drive pulses, the control means controlling the drive pulse generator to generate the drive pulses at a low frequency while controlling the write means to write data on the first track and to generate the drive pulses at a high frequency while controlling the write means to write data on the second track.

6. An apparatus as in claim 5, in which the drive unit comprises a timing signal generator for generating timing pulses at a frequency proportional to a speed of rotation of the disc, comparator means for comparing the frequency of the drive pulses with a frequency of the timing pulses and a motor for rotating the disc, an output of the comparator means being connected to the motor.

7. An apparatus as in claim 6, in which the comparator means comprises a phase locked loop.

8. An apparatus as in claim 1, in which the write means is constructed to generate clock pulses and to write the data on the first and second tracks in synchronism with the clock pulses, the control means controlling the write means to generate the clock pulses at a high frequency while writing data on the first track and to generate the clock pulses at a low frequency while writing data on the second track.

9. An apparatus as in claim 8, in which the drive means is constructed to always rotate the disc at a constant speed.

10. An apparatus as in claim 1, in which the write means is further constructed to selectively write data on a third track which is between the first track and the second track and on a fourth track which is between the third track and the second track, the control means being further constructed to control the drive means to rotate the disc at speeds V1, V2, V3 and V4 while controlling the write means to write data on the first to fourth tracks respectively in accordance with the following relation $$V1 \leq V3 \leq V4 \leq V2.$$

11. An apparatus as in claim 10, in which the control means is constructed to control the drive means in such a manner that V3=V1 and V4=V2.

12. An apparatus as in claim 10, in which the control means is constructed to control the drive means in such a manner that V1=K/R1, V2=K/R2, V3=K/R3 and V4=K/R4 where R3 is a radius of the third track, R4 is a radius of the fourth track and K is a constant.

13. An apparatus as in claim 1, in which the write means is further constructed to selectively write data on a third track which is between the first track and the second track and a fourth track which is between the third track and the second track, to generate clock pulses and selectively write data on the first to fourth tracks in synchronism with the clock pulses, the control means controlling the write means to generate the clock pulses at frequencies F1, F2, F3 and F4 while writing data on the first to fourth tracks respectively in accordance with the following relation $$F1 \geq F3 > F4 \geq F2.$$

14. An apparatus as in claim 13, in which the control means is constructed to control the write means in such a manner that F3=F1 and F4=F2.

15. An apparatus as in claim 13, in which the control means is constructed to control the write means in such a manner that F1=K(R1), F2=K(R2), F3=K(R3) and F4=K(R4) where R3 is a radius of the third track, R4 is a radius of the fourth track and K is a constant.

16. An apparatus as in claim 1, in which the write means is constructed to write the data on the first and second tracks in such a format that the clock bits have a same logical sense as logically high data bits and actual data on the first and second tracks is preceded by an identification area comprising a logically low data bit surrounded by clock bits, the separator means comprising timer means which produce timing signals in response to logically high clock bits and data bits; the window signal generator means generating the clock window signals in response to respective timing signals and generating the data window signals between the clock window signals.

17. A disc memory apparatus including a circular memory disc, drive meams for rotating the disc and write means for selectively writing data on first and second circumferential tracks on the disc having first and second respective track numbers, the second track being spaced radially inwardly from the first track, characterized by comprising:

control means for controlling the write means to write data on the second track with a data density D2 and to write data on the first track with a data density D1 in accordance with the following relation $$D1 > D2(R2/R2)$$

where R2 is a radius of the second track and R1 is a radius of the first track;

the control means being constructed to receive a selected one of the first and second track numbers at an input thereof and control the write means to generate clock pulses for controlling the data density at first and second respective frequencies in response thereto;

the write means comprising a clock pulse frequency divider which is constructed to operate at first and second frequency division ratios in accordance with the selected one of the first and second track numbers applied to the control means for producing the clock pulses at the first and second frequencies respectively;

the control means comprising computing means for computing first and second modulo numbers which are proportional to the first and second radii R1 and R2, the variable frequency divider comprising a variable modulo counter, the control means applying the first and second modulo numbers to a preset input of the counter in accordance with the selected one of the first and second track numbers respectively.

18. A disc memory apparatus including a circular memory disc, drive means for rotating the disc and write means for selectively writing data on first and second circumferential tracks on the disc having first and second respective track numbers, the second track being spaced radially inwardly from the first track, characterized by comprising:

control means for controlling the write means to write data on the second track with a data density D2 and to write data on the first track with a data density D1 in accordance with the following relation $$D1 > D2(R2/R1)$$

where R2 is a radius of the second track and R1 is a radius of the first track;

the control means being constructed to receive a selected one of the first and second track numbers at an input thereof and control the write means to generate clock pulses for controlling the data density at first and second respective frequencies in response thereto;

the control means being constructed to control the drive means to rotate the disc at a low speed while controlling the write means to write data on the first track and to rotate the disc at a high speed while controlling the drive means to write data on the second track; and read means for selectively reading data from the first and second tracks, the control means controlling the drive means to rotate the disc at the low speed while controlling the read means to read data from the first track and to rotate the disc at the high speed while controlling the read means to read data from the second track.

19. A disc memory apparatus including a circular memory disc, drive means for rotating the disc and write means for selectively writing data on first and second circumferential tracks on the disc having first and second respective track numbers, the second track being spaced radially inwardly from the first track, characterized by comprising:

control means for controlling the write means to write data on the second track with a data density D2 and to write data on the first track with a data density D1 in accordance with the following relation $$D1 > D2(R2/R1)$$

where R2 is a radius of the second track and R1 is a radius of the first track;

the control means being constructed to receive a selected one of the first and second track numbers at an input thereof and control the write means to generate clock pulses for controlling the data density at first and second respective frequencies in response thereto;

the write means being constructed to record data on the first and second tracks in the form of data bits separated by clock bits, the apparatus further comprising read means for selectively reading data from the first and second tracks, the read means including separator means for separating the data bits and the clock bits;

the read means comprising pickup means for picking up the data bits and clock bits from the first and second tracks, the separator means comprising data gate means, clock gate means and window signal generator means for generating clock window signals in synchronism with clock bits picked up by the pickup means and data window signals in synchronism with data bits picked up by the pickup means, the window signal generator means feeding the data window signals to the data gate means which gate the data bits therethrough from the pickup means in response to the data window signals and feeding the clock window signals to the clock gate means which gate the clock bits therethrough from the pickup means in response to the clock window signals.

20. An apparatus as in claim 19, in which the write means is constructed to write the data on the first and second tracks in such a format that the clock bits have a same logical sense as logically high data bits and actual data on the first and second tracks is preceded by an identification area comprising a logically low data bit surrounded by clock bits, the separator means comprising timer means which produce timing signals in response to logically high clock bits and data bits, the window signal generator means generating the clock window signals in response to respective timing signals and generating the data window signals between the clock window signals.

21. A disc memory apparatus including a circular memory disc, drive means for rotating the disc and write means for selectively writing data on first and second circumferential tracks on the disc having first and second respective track numbers, the second track being spaced radially inwardly from the first track, characterized by comprising:

control means for controlling the write means to write data on the second track with a data density D2 and to write data on the first track with a data density D1 in accordance with the following relation $$D1 > D2(R2/R1)$$

where R2 is a radius of the second track and R1 is a radius of the first track;

the control means being constructed to receive a selected one of the first and second track numbers at an input thereof and control the write means to generate clock pulses for controlling the data density at first and second respective frequencies in response thereto;

the control means being constructed to control the drive means to rotate the disc at a low speed while controlling the write means to write data on the first track and to rotate the disc at a high speed while controlling the drive means to write data on the second track;

the write means comprising a clock pulse generator for generating the clock pulses and a drive unit for rotating the disc at a speed proportional to the frequency of the clock pulses, the control means controlling the clock pulse generator to generate the clock pulses at the first frequency while controlling the write means to write data on the first track and to generate the clock pulses at the second frequency while controlling the write means to write data on the second track, the second frequency being higher than the first frequency;

the drive unit comprising a timing signal generator for generating timing pulses at a frequency proportional to a speed of rotation of the disc, comparator means for comparing the frequency of the clock pulses with a frequency of the timing pulses and a motor for rotating the disc, an output of the comparator means being connected to the motor.

22. An apparatus as in claim 21, in which the comparator means comprises a phase locked loop.

* * * * *